United States Patent [19]
Varanasi et al.

[11] Patent Number: 6,133,176
[45] Date of Patent: Oct. 17, 2000

[54] METAL BORIDES AS PERFORMANCE MODIFIERS FOR GLASS COMPOSITIONS

[75] Inventors: Srikanth Varanasi, Toledo; Paige L. Higby, Maumee; Gwendolyn A. Young, Toledo, all of Ohio

[73] Assignee: Libbey-Owens-Ford Co., Toledo, Ohio

[21] Appl. No.: 09/176,073

[22] Filed: Oct. 20, 1998

Related U.S. Application Data

[60] Provisional application No. 60/062,527, Oct. 20, 1997.

[51] Int. Cl.$^7$ ........................................... C03C 6/00
[52] U.S. Cl. .................................. 501/27; 501/69; 501/70; 427/426
[58] Field of Search .................................. 501/27, 32, 69, 501/70; 428/426

[56] References Cited

U.S. PATENT DOCUMENTS

| | | |
|---|---|---|
| 1,961,603 | 6/1934 | Berger . |
| 3,944,352 | 3/1976 | Morgan . |
| 4,713,359 | 12/1987 | Lubelski . |
| 4,792,536 | 12/1988 | Pecoraro . |
| 4,931,413 | 6/1990 | Weir et al. ................................ 501/27 |
| 5,077,133 | 12/1991 | Cheng . |
| 5,508,236 | 4/1996 | Chiang . |
| 5,578,533 | 11/1996 | Manabe et al. ........................... 501/32 |
| 6,001,753 | 12/1999 | Varanasi et al. .......................... 501/27 |

FOREIGN PATENT DOCUMENTS 510542  10/1992  European Pat. Off. .

*Primary Examiner*—Karl Group
*Attorney, Agent, or Firm*—Marshall & Melhorn

[57] ABSTRACT

Silicate based glass compositions with boron compounds are included in the composition as performance modifiers to impart desirable color and improved energy absorbance properties. The boron compound is, generally, a metal boride which is added to the batch glass composition in amounts greater than 0.05 weight percent prior to melting the composition and method resulting in a finished glass suitable for use in architectural and automotive glazings.

28 Claims, No Drawings

METAL BORIDES AS PERFORMANCE MODIFIERS FOR GLASS COMPOSITIONS

This application is claiming the benefit, under U.S.C. § 119(e), of the provisional application filed Oct. 20, 1997 under 35 U.S.C. § 111(b), which was granted Ser. No. 60/062,527. The provisional application, 60/062,527 is hereby incorporated by reference.

BACKGROUND OF THE INVENTION

1. Field of the Invention

The present invention is directed to silicate based glass compositions with boron compounds included in the composition as performance modifiers and the methods of making the composition and glass articles formed therefrom. More particularly, the present invention is directed toward the use of metal borides in silicate based glasses for the improvement of spectral properties such as the absorption of infrared energy.

2. Summary of Related Art

Performance modifiers and colorants are often added to base glass compositions to impart specific color and/or energy transmittance properties in the finished glass. The absorption of energy at specific wavelengths is often desirable to enable various uses for the glass compositions. Additionally, certain colors are preferred for various glasses for aesthetic reasons. There are limitations within specific glass compositions that must be balanced or optimized when attempting to achieve desired color and energy transmittance properties. For example, certain ingredients may improve the absorption of near infrared energy while imparting an undesirable color or reducing the light transmittance. Thus, the optimization of a specific color or energy transmittance property often negatively impacts other desirable transmittance properties.

The present invention utilizes metal borides in silicate based glass compositions to improve energy transmittance properties of the finished glass without adversely affecting the color of the glass. The use of a metal boride results in the unexpected improvement of energy transmittance properties when added to conventional silicate based glass compositions. Different metal borides will impact the silicate based glass in different manners. Thus, the selection of a specific metal boride is dependant upon the silicate based glass composition, the additional colorants in the composition, and the desired color or energy transmittance properties. For example, the inclusion of a metal boride in a soda-lime-silica glass, containing an iron colorant, exhibits a reduction in the transmittance of near infrared energy over similar non-boride containing compositions, without adversely affecting the visible light transmittance.

Silicate based glass batch compositions may generally include oxygen-containing boron compounds, such as boron trioxide($B_2O_3$), for the control of physical properties (eg. thermal expansion, viscosity, density and the like) of the glass. The oxygen-containing boron compounds do not have a significant effect upon the color or the transmittance properties of the finished glass. For example, a silicate glass batch composition containing boron trioxide, but without conventional colorants, will result in a clear finished glass.

Additionally, U.S. Pat. No. 3,885,855 discloses the use of boron compounds, specifically metal borides of the group including titanium, zirconium, hafnium, vanadium, niobium, and tantalum borides, as thin coatings applied onto glass substrates. The coatings are utilized to reflect light in the near infrared region.

Infrared absorbing, or heat reducing, silicate glasses are also known within the art. In general, infrared absorbing silicate glasses involve the addition of specific colorants that impact the color and energy transmittance properties of the glass.

U.S. Pat. No. 4,792,536 discloses a process for producing an infrared energy absorbing glass, containing a low total iron concentration which is highly reduced to FeO. It is further disclosed that the infrared energy absorption can be increased by including greater amounts of total iron in the glass composition, but states that the visible light transmittance would thereby be reduced below levels considered adequate for automotive glazings. The disclosed process utilizes a two stage melting and refining operation, which provides highly reducing conditions so as to increase the amount of iron in the ferrous state for a given low total iron concentration of from 0.45% to 0.65% by weight. The patent teaches that the iron must be at least 35% reduced to FeO.

Another example of an infrared absorbing silicate glass is found in U.S. Pat. No. 5,077,133. The patent discloses a green colored infrared and ultraviolet absorbing silicate glass which includes an amount of ceric oxide, or alternatively ceric oxide and titanium dioxide, and a high concentration of moderately reduced iron. The glass composition exhibits a visible light transmittance of at least 70% and a total solar energy transmittance of less than 46%. Although the glass composition exhibits a low solar energy transmittance, it is desirable to further reduce the total solar energy transmittance, through the absorption of near infrared energy, while maintaining the high visible light transmittance.

It would be an advantage to provide a performance modifier for use in a silicate glass composition that significantly improves color and energy transmittance values without adversely impacting other transmittance properties in the finished glass.

SUMMARY OF THE INVENTION

According to the present invention, there is provided a boron compound suitable for use in a silicate batch glass composition as a performance modifier to impart improved color and energy transmittance properties over conventional silicate glasses. The boron compound is generally a metal boride which is added to the batch glass composition prior to melting. The present invention also includes a process for melting the glass batch composition and the articles produced therefrom.

The preferred metal borides suitable for use in the present invention are selected from the group consisting of aluminum boride, calcium boride, chromium boride, cobalt boride, hafnium boride, iron boride, lanthanum boride, magnesium boride, nickel boride, niobium boride, titanium boride, tungsten boride, vanadium boride, and zirconium boride. Each of the metal borides may impart different characteristics to the finished silicate glass. Therefore, the selection of the metal boride is dependent upon the desired color and energy transmittance properties of the finished glass as well as the base glass composition and other colorants included in the base glass composition. Additionally, several of the noted performance modifiers may be utilized in combination in the glass batch composition.

The metal borides of the present invention are added to the batch glass composition prior to the admixing, heating, and melting of the batch. The metal borides are included in the batch glass composition at concentrations from about 0.05% to about 4% by weight. The preferred compounds included in glass compositions are aluminum boride, iron boride, magnesium boride, and titanium boride.

It is an object of the present invention to provide a performance modifier for use in silicate batch glass compositions that improves color or energy transmittance properties of the finished glass composition. The metal borides of the present invention are suitable performance modifiers that are capable of improving the color and energy transmittance properties of the glass over conventional silicate glasses.

DETAILED DESCRIPTION OF THE PREFERRED EMBODIMENT

In accordance with the present invention, it has been discovered that a boron compound may be included in a silicate based batch glass composition as a performance modifier to improve energy transmittance properties of the finished glass. The boron compound is generally a metal boride added to conventional silicate glass compositions. It is desirable to improve solar attenuation properties in glass to improve the efficiency and expand the use of the resulting glass articles. In addition to the solar attenuation properties, specific colors are often desired in finished glass compositions. The metal borides of the present invention can significantly impact one or both of the color and solar attenuation properties of the finished silicate glass.

The present invention is suitable for use in silicate glasses. Silicate glasses are generally glasses which utilize silicon as the network former. The network former is the primary cation which bonds with oxygen to create the amorphous network. In general, silicate glasses are glasses having over 40% silica in the composition. Thus, silicate glasses can include other cations in the glass composition, such as aluminum, sodium, calcium, magnesium, phosphorus, and boron. With conventional batch glass compositions, boron is introduced as an oxygen containing boron compound. The amount of boron is adjusted to control the required physical properties of the finished glass. Silicate glasses are preferred because their physical properties enable the production of the glass in a float glass production process.

A preferred silicate glass is a soda-lime-silica composition. The composition of soda-lime-silica glasses suitable for use in accordance with the present invention typically have the following weight percentage constituents:

| | |
|---|---|
| $SiO_2$ | 65–80% |
| $Na_2O$ | 10–20 |
| CaO | 5–15 |
| MgO | 0–10 |
| $Al_2O_3$ | 0–5 |
| $K_2O$ | 0–5 |
| BaO | 0–5 |
| $B_2O_3$ | 0–5 |
| $Ga_2O_3$ | 0–5 |

Other minor ingredients, including conventional melting and refining aids such as sulfur compounds (measured as $SO_3$), may also appear in the glass composition at levels up to 1 weight percent without affecting the properties of the finished glass composition. Suitable raw materials for producing a soda-lime-silica glass include, sand, limestone, dolomite, soda ash, salt cake or gypsum, and niter.

The silicate based glass compositions, to which the metal borides of the present invention are added, may include conventional colorants. In addition to coloring the glass, the colorants may also impart certain energy attenuation properties such as the absorption of infrared and ultraviolet radiation. The metal borides of the present invention, when included with the known colorants, can affect the color and energy transmittance properties beyond anticipated effects generally recognized with the colorants alone.

In accordance with the present invention, one or more metal borides are added to the silicate batch glass composition. The metal borides are preferably selected from the group consisting of aluminum boride, calcium boride, chromium boride, cobalt boride, hafnium boride, iron boride, lanthanum boride, magnesium boride, nickel boride, niobium boride, titanium boride, tungsten boride, vanadium boride, and zirconium boride. The metal borides may be added up to about four (4) weight percent in the silicate batch glass composition prior to melting.

The preferred embodiment of the present invention is the use of one or more metal borides with iron-containing compounds, as a colorant, in a silicate batch glass composition. The combination of the metal borides with iron-containing compounds having a total iron content measured as $Fe_2O_3$, of about 0.1 to 4.5 weight percent, improves the absorption of infrared energy without adversely impacting the visible light transmittance. Thus, the metal borides are capable of increasing the difference between the visible light transmittance and the direct solar heat transmittance over conventional glasses utilizing iron alone, such, that a glazing produced from a suitable batch glass composition has an Illuminant A visible light transmittance greater than 70% and a direct solar heat transmittance less than 44% at a nominal thickness of 3–6 mm. For certain applications a glazing having a visible light transmittance greater than 75% and a direct solar heat transmittance less than 49% would be desirable, and such properties can be achieved with the batch glass compositions of the present invention.

Iron boride is most preferred, as it provides both the iron and the boride in the glass batch composition. Iron boride compounds suitable for use as performance modifiers may be expressed as $Fe_xB$, where x=1–3.

The metal borides included in the silicate glass batch composition are admixed, heated, and melted to form the finished glass. Conventional glass batch mixing devices are utilized in compounding the ingredients. The batch materials are conveniently melted together in a conventional glass making furnace, to form a silicate glass composition, which thereafter may be continuously cast onto the molten metal bath in a float glass production process.

The glasses produced in accordance with the present invention are suitable for various applications, including automotive and architectural glazings. Examples of automotive applications would include windshields, side lights, and backlights of various thicknesses and energy transmittance properties. Additionally, the combination of colorants used in conjunction with the metal borides may be selected to produce various shades of glass, such as for example clear, green, blue, blue-green, gray, dark gray, and bronze glasses. The finished silicate glass includes over 40 mole % silica.

The following examples in Table I illustrate glass compositions in accordance with the invention that are readily formed into glass articles or glazings. Each example includes a soda-lime-silica base glass composition prepared in accordance with the present invention. The specific metal boride performance modifier and colorant compositions are noted for each example.

The examples were prepared by weighing the noted ingredients, colorants, and performance modifiers on a Mettler balance. The colorants and performance modifiers were added to a conventional base glass batch composition including sand, dolomite, limestone, soda ash, and gypsum. The ingredients were thoroughly mixed to provide a homogeneous mixture and then placed in a high temperature crucible. The crucibles were then placed in a gas-fired furnace. The temperature of the furnace was slowly ramped to 2600° F. and held at that temperature for over four hours. During the high temperature holding step, the crucibles were removed after two and one half hours and the melt was stirred. The crucibles were then placed back into the furnace for the remaining one and one half hours. Upon completion of the melting phase, the crucibles were removed from the furnace. The molten samples were poured into a 2"×4" graphite mold to form glass slabs. The slabs were immediately transferred to an annealer operating at 1150° F. and held for one to two hours. The slabs were then cooled overnight in the furnace.

The transmittance values for each of the slabs were measured on a Perkin Elmer Lambda 19 Spectrophotometer. The spectral data was collected and then utilized to calculate the optical values for Illuminant A (Ill A), direct solar heat transmittance (DSHT), ultraviolet radiation transmittance (Tuv), and CIE color scale coordinates (L*, a*, and b*). The optical values were calculated in accordance with the ASTM E 308-90 test method for computing the colors of objects by using the CIE system (Ill C two degree observer) and Parry Moon solar energy distribution curve at an air mass of 2.0.

Comparative examples are also included in the examples. The comparative examples are conventional glass compositions of similar color without the use of metal borides in the batch composition.

The examples illustrate but do not limit the invention. In the examples, all parts and percentages are by weight and:

(a) $Fe_2O_3$, $TiO_2$, $Fe_2B$, $VB_2$, and $TiB_2$ are expressed in percent; $CO_3O_4$, Se, NiO, are expressed in parts per million (ppm);

(b) total iron is expressed as if all iron present were present as $Fe_2O_3$;

(c) the transmittance data in the Table below and throughout are based on the nominal glass thickness reported in the table.

In accordance with the provisions of the patent statutes, the present invention has been described in what is considered to represent its preferred embodiment. It should be noted, however, that the invention can be practiced otherwise as described, without departing from its spirit and scope.

TABLE I

| Example | Color | wt % $Fe_2O_3$ (Rouge) | wt % MxBy | wt % Tot $Fe_2O_3$ | wt % $TiO_2$ | $Co_3O_4$ (ppm) | Se (ppm) |
|---|---|---|---|---|---|---|---|
| | | | | | | @ 5.6 mm thickness | |
| 1 | clear (LOF) | 0.12 | | 0.12 | | | |
| 2 | clear | | 0.06(FeB) | 0.12 | | | |
| 3 | bronze (LOF) | 0.34 | | 0.34 | | 43 | 13 |
| 4 | bronze | 0.23 | 0.2(FeB) | 0.48 | | | 127 |
| 5 | grey (LOF) | 0.285 | | 0.285 | | 80 | 10 |
| 6 | grey | 0.442 | 0.133(FeB) | 0.616 | | 85 | 25 |
| 7 | blue green | 0.665 | 0.12($AlB_2$) | 0.665 | | | |
| 8 | blue | 0.665 | 0.12 ($CrB_2$) | 0.665 | | | |
| 9 | blue | 0.665 | 0.012($Co_2B$) | 0.665 | | | |
| 10 | green | 0.665 | 0.12($HfB_2$) | 0.665 | | | |
| 11 | green | 0.665 | 0.12($LaB_6$) | 0.665 | | | |
| 12 | blue green | 0.665 | 0.12($MgB_2$) | 0.665 | | | |
| 13 | green | 0.665 | 0.012(NiB) | 0.665 | | | |
| 14 | green | 0.665 | 0.12(NbB) | 0.665 | | | |
| 15 | green | 0.665 | 0.12($WB_2$) | 0.665 | | | |
| 16 | blue green | 0.665 | 0.12($ZrB_2$) | 0.665 | | | |
| 17 | blue | 0.665 | 0.12($CaB_2$) | 0.665 | | | |
| 18 | blue | 0.665 | 0.12($CaB_2$) | 0.665 | | | |
| 19 | blue | 0.5 | 0.12($TiB_2$) | 0.5 | | | |
| 20 | green | 0.6(FeB) | 0.12($VB_2$) | 0.8 | | | |
| | | | | | | @ 4 mm thickness | |
| 21 | green (EZk) | 0.8 | | 0.8 | 0.4 | | |
| 22 | green | 0.55 | 0.13(FeB) | 0.71 | 1 | | |
| 23 | green | 0.73 | 0.12($VB_2$) | 0.73 | | | |
| 24 | dk grey(Gal) | 1.44 | | 1.44 | | 238 | 2 |
| 25 | dk grey | 1.3 | 0.19(FeB) | 1.55 | | 226 | 1.6 |

| Example | NiO (ppm) | ILLA | DSHT | ILLC | Tuv | L* | a* | b* |
|---|---|---|---|---|---|---|---|---|
| 1 | | 87.9 | 76.9 | 88 | 72.4 | 95.3 | −2.2 | 0.02 |
| 2 | | 87.4 | 78.3 | 87.8 | 69.9 | 95.1 | −2.07 | 0.07 |
| 3 | | 56.1 | 56 | 55 | 34.7 | 79.1 | 1.68 | 6.14 |
| 4 | | 54 | 40.5 | 51.82 | 26.4 | 77.2 | 2.8 | 17.5 |
| 5 | 84 | 45.8 | 47.6 | | 40.9 | 73.5 | 0.1 | −1.7 |
| 6 | | 41.5 | 34.3 | 42.1 | 31.7 | 70.94 | −2.2 | −3.09 |
| 7 | | 64.5 | 34.4 | 67.45 | 41.7 | 85.73 | −12.16 | −4.51 |
| 8 | | 51.5 | 38.3 | 53.73 | 29.8 | 78.3 | −32.78 | −30.64 |
| 9 | | 55.4 | 43.2 | 57.83 | 36.6 | 80.65 | −7.35 | −9.23 |
| 10 | | 73.1 | 47.8 | 74.6 | 36.9 | 89.21 | −8.06 | 1.76 |
| 11 | | 72.4 | 45.8 | 74.14 | 38.1 | 88.99 | −8.6 | 0.44 |
| 12 | | 66.6 | 37.3 | 69.1 | 40.1 | 86.55 | −10.99 | −2.76 |

TABLE I-continued

| | | | | | | | |
|---|---|---|---|---|---|---|---|
| 13 | | 68.5 | 47.6 | 69.1 | 35.8 | 86.57 | −7.62 | 7.07 |
| 14 | | 75.4 | 52 | 76.56 | 35.4 | 90.12 | −7.38 | 3.28 |
| 15 | | 74.7 | 50.6 | 75.97 | 36.4 | 89.84 | −7.46 | 2.71 |
| 16 | | 72.5 | 45.1 | 75.62 | 42.2 | 88.24 | −8.72 | −0.72 |
| 17 | | 69.9 | 39.5 | 72.63 | 51.9 | 88.6 | −10.3 | −4.7 |
| 18 | | 62.6 | 31.9 | 65.82 | 41.3 | 84.9 | −13.1 | −5.3 |
| 19 | | 75.1 | 49 | 76.73 | 44.9 | 90.2 | −7.6 | −0.1 |
| 20 | | 48.6 | 23.8 | 51.21 | 27.8 | 77.2 | −21.2 | 1.2 |
| 21 | | 71.5 | 44.5 | 73 | 35 | 88.5 | −8.8 | 3.3 |
| 22 | | 70 | 42.5 | 72.24 | 30.7 | 87.6 | −9.55 | 5.5 |
| 23 | | 66.8 | 44.1 | 68.69 | 33 | 86.35 | −11.65 | 2.81 |
| 24 | 273 | 17.6 | 15.2 | 18 | 9.2 | 49.2 | −3.9 | 3.3 |
| 25 | 264 | 15.8 | 11.9 | 17.2 | 9.4 | 48 | −4.5 | 2.5 |

What is claimed is:

1. A batch glass composition comprising a silicate batch glass mixture wherein said silicate glass batch mixture is a soda-lime-silica batch class batch mixture which includes over 40 mole % silica, and at least one metal boride as a performance modifying agent.

2. A batch glass composition as defined in claim 1, wherein said metal borides are selected from the group consisting of aluminum boride, calcium boride, chromium boride, cobalt boride, hafnium boride, iron boride, lanthanum boride, magnesium boride, nickel boride, niobium boride, titanium boride, tungsten boride, vanadium boride, and zirconium boride.

3. A batch glass composition as defined in claim 1, wherein said batch glass mixture contains about 0.05 weight percent or more of metal boride.

4. A batch glass composition as defined in claim 1, wherein said batch glass mixture contains an amount of a metal boride from about 0.05 to about 4 weight percent.

5. A batch glass composition comprising:
   a) a soda-lime-silica float glass batch mixture including from about 65 to about 80 weight percent $SiO_2$, from about 10 to about 20 weight percent $Na_2O$, from about 5 to about 15 weight percent CaO, from about 0 to about 10 MgO, from about 0 to about 5 weight percent $Al_2O_3$, from about 0 to about 5 weight percent $K_2O$, from about 0 to about 5 weight percent BaO, from about 0 to about 5 weight percent $B_2O_3$, from about 0 to about 5 wt % $Ga_2O_3$; and
   b) an amount of at least one metal boride.

6. A batch glass composition as defined in claim 5, wherein said batch glass mixture includes an amount of an iron containing compound, or compounds, so as to result in a finished glass having a total iron content, measured as $Fe_2O_3$, of about 0.1 to about 4.5 weight percent.

7. A batch glass composition as defined in claims 5, wherein said metal boride is included in the batch mixture in an amount from about 0.05 to about 4 weight percent.

8. A batch glass composition as defined in claim 5, wherein said metal boride is selected from the group consisting of aluminum boride, iron boride, magnesium boride, and titanium boride.

9. A glazing produced from the batch glass composition and resulting finished glass of claim 5, characterized in that said glazing has an Illuminant A visible light transmittance of greater than 70% and a direct solar heat transmittance of less than 45% at a nominal thickness of 3–6 mm.

10. A finished silicate glass resulting from the admixing, heating, and melting of an amount of at least one metal boride in a batch glass mixture.

11. A finished silicate glass as recited in claim 10, wherein said silicate glass includes over 40 mole % silica.

12. A finished silicate glass as recited in claim 10, wherein said batch glass composition contains an amount of a metal boride from about 0.05 to about 4 weight percent.

13. A finished silicate glass resulting from the admixing, heating and melting of an amount of at least one metal boride in a batch glass mixture wherein said finished glass includes from about 0.1 to 4.5 weight percent $Fe_2O_3$ (total iron).

14. A finished silicate glass as recited in claim 13, wherein said glass at a thickness in the range of 3 mm to 6 mm has an Illuminant A visible light transmittance of at least 70% and direct solar energy transmittance of less than 44%.

15. A finished soda-lime-silica glass as recited in claim 10, wherein said metal boride is selected from the group consisting of aluminum boride, iron boride, magnesium boride, and titanium boride.

16. A laminated automotive glazing unit, comprising two sheets of a silicate glass integrally adhered together, said glass resulting from the admixing, melting and heating of at least one metal boride in a batch glass composition.

17. An automotive glazing unit as recited in claim 16, wherein said soda-lime-silica glass includes about 0.1 to 4.5 weight percent $Fe_2O_3$ (total iron).

18. An automotive glazing unit as recited in claim 16, wherein said glazing unit has an Illuminant A visible light transmittance of greater than 70% and total solar energy transmittance of less than 44%.

19. An automotive glazing unit as recited in claim 16, wherein said glazing unit has an Illuminant A visible light transmittance of greater than 75% and total solar energy transmittance of less than 49%.

20. An automotive glazing unit as recited in claim 16, wherein each of said glass sheets has a thickness in the range of from about 1.7 mm to about 2.5 mm.

21. A process for melting a batch glass composition and producing a silicate finished glass, "said glass resulting from" admixing, heating and melting:
   (a) a silicate float glass batch mixture: and
   (b) a quantity of at least one metal boride.

22. A method for producing a soda-lime-silica glass comprising admixing, heating, and melting a batch glass composition comprising from about 65 to about 80 weight percent $SiO_2$, from about 10 to about 20 weight percent $Na_2O$, from about 5 to about 15 weight percent CaO, from about 0 to about 10 MgO, from about 0 to about 5 weight percent $Al_2O_3$, from about 0 to about 5 weight percent $K_2O$, from about 0 to about 5 weight percent BaO, from about 0 to about 5 weight percent $B_2O_3$, from about 0 to about 5 wt % $Ga_2O_3$, and an amount of one or more metal borides.

23. A method as recited in claim 22, wherein said metal boride is included in the batch mixture in an amount from about 0.05 to about 4 weight percent.

24. A method as recited in claim 22, wherein said metal boride is one or more compounds selected from the group consisting of aluminum boride, iron boride, magnesium boride, and titanium boride.

25. A method as recited in claim 22, wherein said batch glass mixture includes an amount of an iron containing compound, or compounds, so as to result in a finished glass having a total iron content, measured as $Fe_2O_3$, of about 0.1 to about 4.5 weight percent.

26. A method as recited in claim 22, wherein said metal boride are selected from the group consisting of aluminum boride, calcium boride, chromium boride, cobalt boride, hafnium boride, iron boride, lanthanum boride, magnesium boride, nickel boride, niobium boride, titanium boride, tungsten boride, vanadium boride, and zirconium boride.

27. A method as recited in claim 22, wherein said metal boride is included in the batch mixture in an amount from about 0.05 to about 4 weight percent.

28. A method as recited in claim 22, wherein said melted silicate glass is cast onto a molten metal bath in a float glass process.

* * * * *